Oct. 2, 1928.
J. S. THOMPSON
1,686,190
FRICTION BLOCK
Filed April 13, 1927.
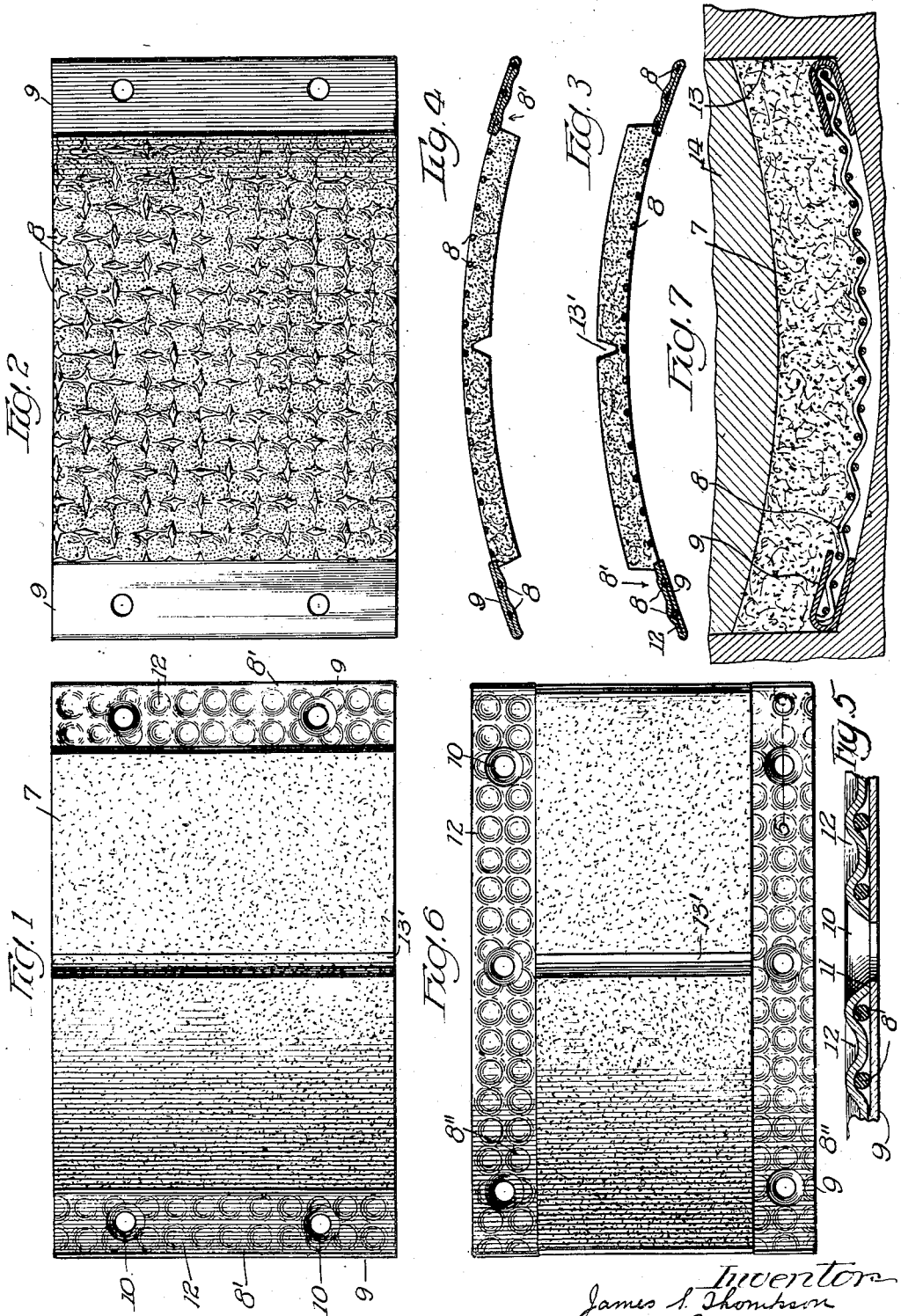

Patented Oct. 2, 1928.

1,686,190

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BLOCK.

Application filed April 13, 1927. Serial No. 183,383.

This invention relates generally to friction brakes and more particularly to the provision of a novel block or shoe for braking a moving member by frictional contact therewith.

The object of the invention is to provide a novel and efficient friction brake block which can be made in a form and a size adapted for any friction brake assembly and provided with means whereby it may be easily and quickly secured in rigid position therein.

Another object of the invention is to provide a friction block which is capable of yielding so that it can be made to conform with the support upon which it is mounted and the friction surface with which it engages, and without damaging or destroying the efficiency of any part of the block.

Another object of the invention is to provide a friction block comprising a composition body mounted upon and securely anchored to a reticulated metal back and having means whereby the ends of the back may be employed for securing the block in a friction brake assembly.

And another object of the invention is to reinforce projecting portions of the reticulated metal back of a friction block to enable the block to be secured in a friction brake assembly by fastening devices engaging said reinforced projections and to withstand the strains and stresses of service.

There are many different kinds of brake assemblies in which a block or shoe of this type may be employed, but for the purposes of this application I have shown the invention embodied in forms adapted for internal expanding and external contracting brakes for automotive vehicles.

Referring to the drawings:

Fig. 1 is a front view, Fig. 2 is a back view, and Fig. 3 is an edge view of a block for an internal expanding brake and Fig. 4 is a similar view of a block for an external contracting brake.

Fig. 5 is a detail enlarged sectional view on the line 5—5 of Fig. 1.

Fig. 6 shows the projecting parts of the back at the sides of the block.

Fig. 7 shows how the block is molded.

The block comprises a body 7 mounted upon and anchored to a reticulated metal back 8 which may be made of wire mesh, expanded metal, or some other form of reticulated metal. The body is made of a suitable composition which will provide friction sufficient for the intended purpose and which is wear and heat resistant. I do not claim the composition in this application because the invention herein claimed is not restricted to the use of a particular composition, but is capable of use with a body formed of any composition suitable for the intended purpose.

The back is embedded in the body and is rigidly united therewith. Portions of the back project beyond the body of the block to receive the means whereby the block is secured in place on its support. In Figs. 1–4 the back projects beyond the ends of the body at 8' and in Fig. 6 the back projects beyond the sides of the body at 8''. Each projecting part of the back is provided with a reinforce on both sides which is preferably in the form of a strip of sheet metal 9 which is bent upon itself in U-shape and encloses the projecting part of the back. This strip reinforces the back where it receives the fastening means by which the block is secured on its support, the strip being provided with openings 10 to receive the fastening devices. These openings are punched through the doubled reinforce and the enclosed projecting part of the back, and this punching will ordinarily proceed from the front of the block so that the edge 11 surrounding each opening will be depressed through the end 8' of the back to engagement with that part of the strip at the back of the block (Fig. 5). For some purposes the depression of the edge or edges of the openings in the interstices of the reticulated back may be sufficient to provide a secure anchorage for a strip on the back and for the fastening means to the block, but I prefer to indent or depress other portions of the strip in the reticulations of the back, as indicated at 12, so that the strip will be anchored to the back substantially throughout one side thereof.

This indenting of the strip in the interstices of the back may be accomplished in any suitable manner. I have found that it can be conveniently accomplished in the operation of molding the body on the back. In Fig. 7 I have shown a mold 13 having a movable plunger 14. The back with the U-shaped strips on its ends is arranged in the mold with the body material and pressure is then applied by operating the plunger 14 to form the block. The pressure applied through the plunger 14 will be sufficient to produce indentations of the strip throughout its length, as indicated at 12. The block may then be removed from the mold and the portions of the body engaging the strips may be removed to clear the strips, as shown in Figs. 1–4. Then the openings 10 are punched. That portion of the doubled strip which lies on the front or body side of the reticulated back is indented as previously decribed, while that portion of the doubled strip which lies on the back of the reticulated back is left flat so that it will make flat engagement with the block support. Indenting the strips as herein described insures a secure anchorage of the strips to the reticulated back and also provides a rigid reinforcement at the extended ends of the back for anchoring the fastening devices with the block.

To make the block sufficiently yielding and to enable it to be adjusted to conform with the curvature of its support I provide the body with one or more transverse kerfs 13 which extend to or substantially to the reticulated back. The kerf enables the block to be bent between its ends to fit supports which vary considerably in curvature and this is a desirable feature in the commercial use of blocks of this kind because a single block may be adapted for use in a number of installations differing in the curvature of the supports.

The invention may be embodied in brake blocks for friction brakes of different kinds. In Fig. 3 I have shown it adapted for an internal expanding brake and in Fig. 4 for an external contracting brake for an automotive vehicle. The construction and arrangement of parts may be changed as required to adapt it for other installations and I reserve the right to make all such changes as fall within the following claims:

I claim:

1. A friction block comprising a reticulated back and a composition body mounted thereon, a part of the back projecting beyond the body, and a metal strip doubled on said projecting part and secured thereto.

2. A friction block comprising a reticulated back and a composition body mounted thereon, a part of the back projecting beyond the end of the body, and a metal strip doubled on said projecting part and secured thereto.

3. A friction block comprising a reticulated back and a composition body mounted thereon, a part of the back projecting beyond the body, and a metal strip secured on said projecting part and indented in the interstices thereof.

4. A friction block comprising a reticulated back and a composition body mounted thereon, a part of the back projecting beyond the body, and a metal strip doubled on said projecting part and secured thereto, one side of said doubled metal strip being indented in the interstices of said projecting part.

5. A friction block comprising a reticulated back and a composition body mounted thereon, a part of the back projecting beyond the body, and a metal strip doubled on said projecting part, there being an opening through the doubled metal strip and the projecting part enclosed therein, the edge of said opening on one side of said doubled metal strip being depressed to interlockingly engage said projecting part.

6. A friction block comprising a reticulated back and a composition body mounted thereon, a part of the back projecting beyond the body, and a metal strip doubled on said projecting part, there being an opening through the doubled metal strip and the projecting part enclosed therein, the edge of said opening on one side of said doubled metal strip being depressed to engage the other side of said doubled strip.

7. A friction block comprising a reticulated back and a composition body mounted thereon, a part of the back projecting beyond the body, and a metal strip doubled on said projecting part, said strip being indented in the interstices of the projecting part and having one or more openings extending through both sides of the strip and the enclosed projecting part and having the edge of said opening in one side of the strip depressed to engage the other side of the strip.

8. A friction block comprising a reticulated back and a composition body mounted thereon, a part of the back projecting beyond the body, and a reinforce secured to said projecting part on both sides thereof.

9. A friction block comprising a reticulated back and a composition body mounted thereon, a part of the back projecting beyond the body, and a reinforce secured on both sides and the end edge of said projecting part.

JAMES S. THOMPSON.